United States Patent [19]
Laronga et al.

[11] Patent Number: 5,249,077
[45] Date of Patent: Sep. 28, 1993

[54] DARKFIELD ILLUMINATOR FOR A MICROSCOPE SLIDE

[75] Inventors: Victor Laronga, Mendon, Mass.; Stanley Thorburn, Providence, R.I.

[73] Assignee: Microvideo Instruments, Inc., Avon, Mass.

[21] Appl. No.: 806,107

[22] Filed: Dec. 12, 1991

[51] Int. Cl.⁵ .......................... G02B 21/10; G02B 6/00
[52] U.S. Cl. .................................... 359/385; 359/390; 362/31; 385/901
[58] Field of Search .................. 359/385, 387, 390; 385/121, 129, 901; 362/31, 32, 26, 27

[56] References Cited

U.S. PATENT DOCUMENTS

| | | | |
|---|---|---|---|
| 2,118,777 | 5/1938 | Hammer | 362/26 |
| 2,827,557 | 3/1958 | Neugass | 362/27 |
| 3,561,145 | 2/1971 | Shotwell | 362/26 |
| 3,892,959 | 7/1975 | Pulles | 362/31 |
| 4,297,032 | 10/1981 | Temple | 356/366 |
| 4,460,939 | 7/1984 | Murakami et al. | 362/32 |
| 4,621,911 | 11/1986 | Lanni et al. | |
| 4,729,067 | 3/1988 | Ohe | 362/31 |
| 5,005,108 | 4/1991 | Pritash et al. | 362/31 |
| 5,101,325 | 3/1992 | Davenport et al. | 362/32 |

FOREIGN PATENT DOCUMENTS

| | | |
|---|---|---|
| 2316943 | 9/1974 | Fed. Rep. of Germany . |
| 3216439 | 11/1983 | Fed. Rep. of Germany . |
| 3417075 | 11/1985 | Fed. Rep. of Germany . |
| 3620746 | 12/1987 | Fed. Rep. of Germany ...... 359/385 |
| 0085446 | 7/1978 | Japan . |

OTHER PUBLICATIONS

Temple, P. A., "Improved Dark-Field-Like Surface Inspection Technique Using Total Internal Reflection", SPIE, pp. 44-51, vol. 190, LASL Optics Conference (1979).

Primary Examiner—Jon W. Henry
Attorney, Agent, or Firm—Wolf, Greenfield & Sacks

[57] ABSTRACT

A microscope slide illuminator for lighting a slide from the edges in a manner that limits light entering the microscope lens to light that is reflected or refracted by the specimen on the slide. The light source includes one or more fiber optic bundles with one end arranged in a fan like array aligned with the edge of a slide and the other end adopted to be connected to a lamp. The bundles are contained in a housing shaped to receive a slide.

10 Claims, 2 Drawing Sheets

DARKFIELD ILLUMINATOR FOR A MICROSCOPE SLIDE

BACKGROUND OF THE INVENTION

1. Field of the Invention

This invention relates to a new and improved method for illuminating a microscope slide and, in particular, illuminating a specimen in a darkfield.

2 Background

In many medical and biological research procedures, foreign particles and substances are used to label specific structures for the purpose of observation. For example, in autoradiography, biological specimens are covered with a photosensitive emulsion of silver grains to expose areas on which previously injected radioactive tags have collected.

One method of illuminating the specimens to show the silver grains is known as darkfield illumination. In this method, direct light is prevented from entering the objective by placing an opaque stop at the center of the condenser. This arrangement creates a light cone configuration permitting the observer to see the specimen illuminated by the light scattered or diffracted by it. Because the standard microscope condenser must be precisely covered with the opaque stop to form the light cone, using this darkfield illumination technique is time consuming. Most researchers replace the entire condensed with a condenser which has the opaque stop already fitted, but this too is time consuming. Also, each condenser is limited to a small range of magnifications, and, in fact, many darkfield condensers will not work with low power objectives.

Other disadvantages of this darkfield illumination technique include the difficulty of alignment as well as the requirement that the top lens of the condenser be immersed in oil if used with objectives of 0.80 numerical aperture or higher.

Another method of illuminating silver grains is the reflective polarized light method, also called EPI-polarized light. However, problems exist with this system at low magnification including the lack of sufficient light intensity as well as extraneous reflections which inhibit proper viewing. The reflective polarized light assembly also precludes the simultaneous use of EPI-fluorescence.

SUMMARY OF THE INVENTION

The principle object of the present invention is to provide a microscope illuminator which illuminates the entire slide, thereby accommodating a full range of objective magnifications.

Another object of the present invention is to provide an improved microscope slide illuminator which may be used in combination with transmitted light techniques such as bright field, phase contrast, differential interference contrast, modulation contrast, and darkfield.

It is still a further object of the present invention to provide a slide illuminator which can be combined with reflected light fluorescence, also known as EPI-fluorescence.

It is still a further object of the present invention to provide a slide illuminator which may fit a standard light microscope.

It is a further object of the present invention to provide a slide illuminator through which slides are easily loaded and unloaded.

To accomplish these and other objects, the illuminator for a microscope slide of the present invention comprises a light source secured in longitudinal alignment with an edge of a slide and with the light emanating from the light source confined to that edge so as to cause the light to pass into the slide to illuminate the specimen.

These and other objects and features of the present invention will be better understood and appreciated from the following detailed description of one basic embodiment thereof, selected for the purpose of illustration and shown in accompanying drawings, in which:

DETAILED DESCRIPTION

Figure 1:
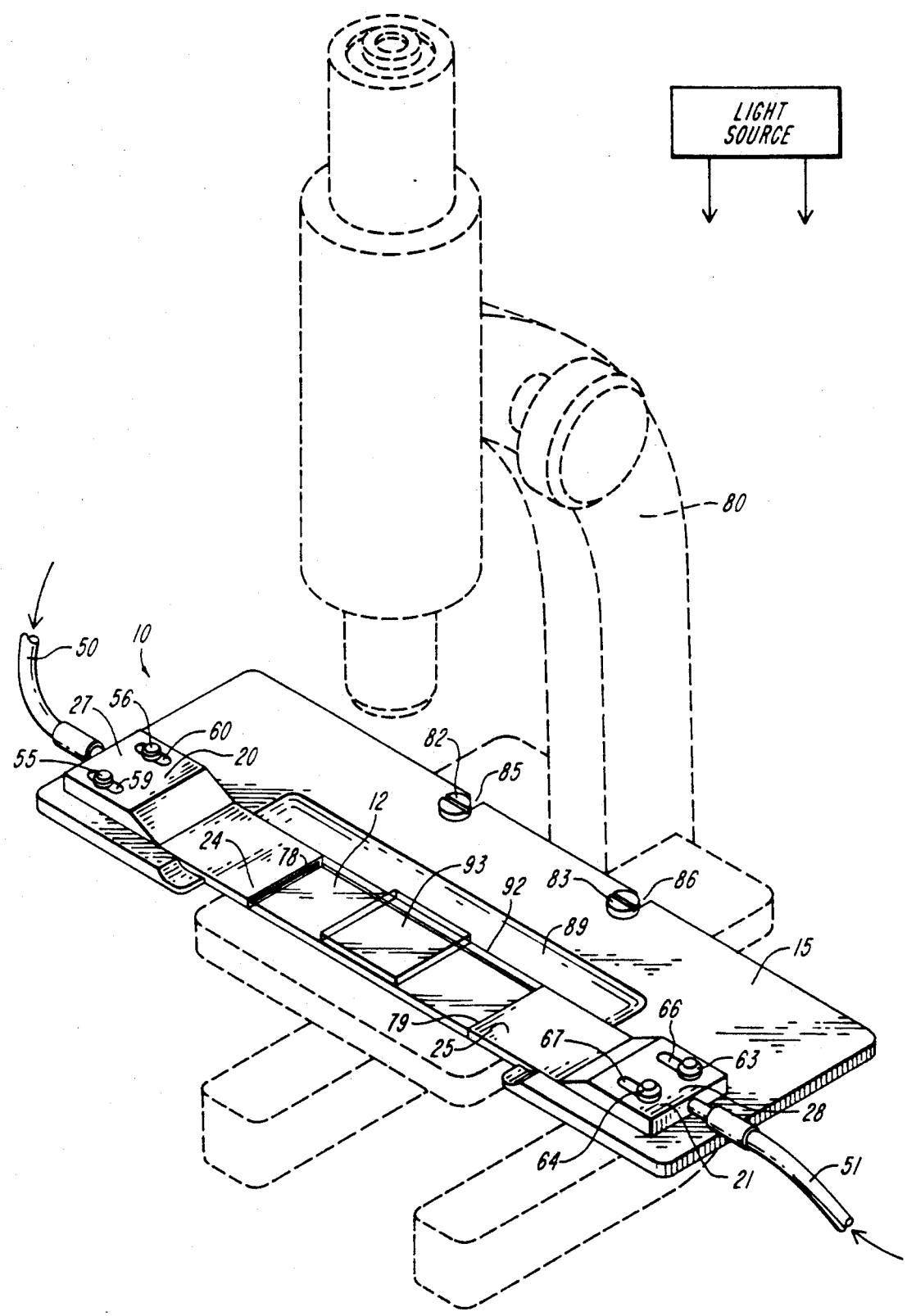
FIG. 1 is a perspective view showing the present invention wherein the dotted lines represent a microscope not claimed in this application.

The overall arrangement and function of this microscope slide illuminator 10 may be best understood from FIG. 1, which illustrates a preferred embodiment of the invention intended for illumination of a slide 12 from opposing longitudinal edges. The principle components of the slide illuminator 10 comprise a U-shaped plate 15 supporting a pair of light source housings 20 and 21 in facing coplanar alignment.

The housings 20 and 21 are similar in construction. Each has a rectangular planar shape with proximal ends 24, 25 which are displaced downwardly from distal ends 27, 28 forming a shoulder 30 (not shown), 31 on the lower surface.

Figure 2:
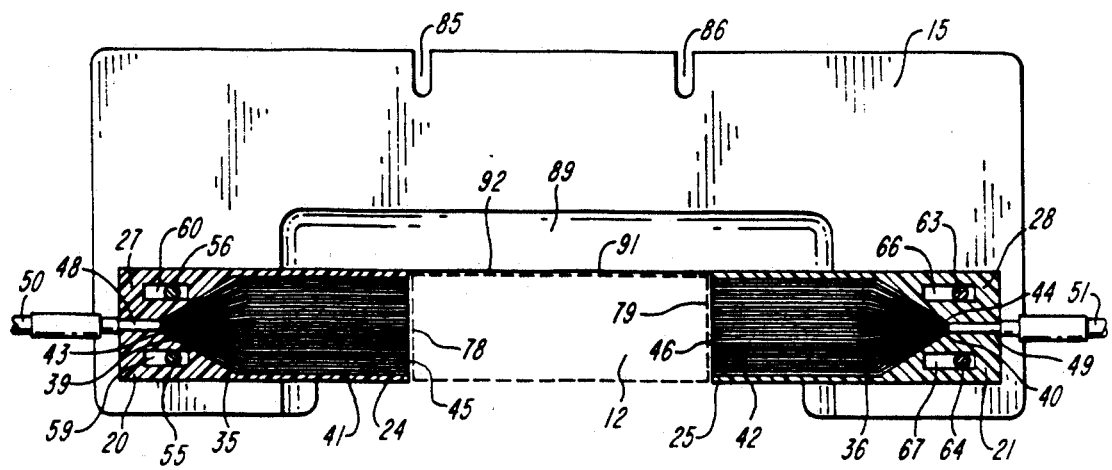
FIG. 2 shows a plan view of the invention.
Figure 3:
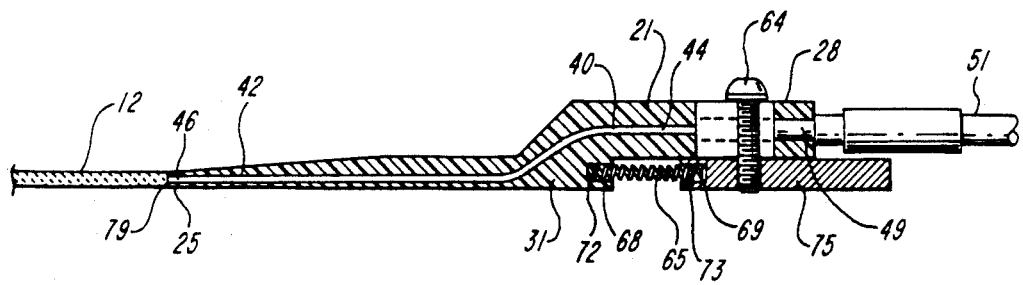
FIG. 3 shows a side elevational cross section view of the present design taken along the lines 3—3 of FIG. 2.

Each housing 20 and 21 contains light source means 35 and 36 (FIGS. 2, 3) each of which comprises a fiber optic bundle 39 and 40 having a diameter of 3.17 mm. The individual optical fibers each 0.05 mm in diameter, forming the bundles 39, 40 are arranged in planar fan like arrays 41, 42 within housings 20, 21. The fan-like array 41, 42 has a narrow end 43, 44 and a wide end 45, 46. The individual fibers at the wide end 45, 46 each terminate and are polished for coplanar alignment with the respective proximal end 24, 25 of the housing 20, 21 within which it is located. The wide end 45, 46 has preferably a width almost the width of the proximal end 24, 25 and is no wider than the slide to be used. The wide end 45, 46 comprises approximately fourteen optical fiber in thickness.

The narrow end of the fibers are gathered into ferrules 48 and 49, measuring 14.2 mm in length, which are coaxially aligned with leads 50 and 51, each having a diameter of 5.65 mm. Leads 50 and 51 extend from the distal ends 27 and 28 of the housings 20 and 21 and are attached to an apparatus for transmitting light through the leads 50 and 51. The apparatus which is not shown is preferably a standard fiber optic light housing with a 150 watt halogen lamp which can accommodate two fiber bundles. A more intense lamp or one with larger capacity may also be used.

The housings 20 and 21 are each secured on the base 15 in longitudinal alignment with their respective proximal ends 24 25 in parallel facing relation. The housing 20 is preferably secured on the base 15 by screws 55, 56. The screws 55, 56 extend through slots 59, 60. Slots rather than holes are used to minimize manufacturing costs since housing 21 necessarily requires slots. Housing 21 is secured on the base 15 by screws 63, 64 which project through slots 66, 67. The fit between screws 63, 64 and slots 66, 67, is loose which permits the housing 21 to slide reciprocally to and away from housing 20.

A helical spring 65 extending longitudinally and symmetrically below the housing 21 has one end 68 engaged in a recess 72 in the shoulder 31 and the other end 69 engaged in a recess 73, in a rear wall 75 in which the housing 21 slides.

The spring tensions the housing 21 toward housing 20 with movement limited by the length of slots 66, 67. Thus a slide 12 may be held between stationary housing 20 and sliding housing 21. The wide ends 45, 46 of the fibers abut edges 78 and 79 of a slide 12 positioned in the plate 15. The height and length of the wide end 45, 46 of the fiber optic array 41, 42 is less than the corresponding dimensions of the ends of the slide 12. With the standard 1×3 inch slide which is 1 mm thick, the dimensions of the wide ends 45, 46 should be approximately 20.3 mm long and 0.7 mm high.

The plate 15 is secured to a microscope 80, as shown in FIG. 1, by spaced stage screws 82 and 83 on standard microscopes which extend through screw slots 85 and 86. The plate 15 also has a disengagement means 89 to permit removal of the slide 12 from between the housings 20 and 21. The disengagement means 89 comprises a sloped step having a proximal end 91 which is adopted to engage a lateral edge 92 of the slide 12. This means 89 permits a user to remove the slide 12 without having to grip the slide itself. The slide 12 may be pushed outwardly from the slide illuminator 10 under finger pressure. The lateral edge 92 is higher than the proximal end 91 of the disengagement means 89 which exposes a portion of the lateral edge 92 for manual disengagement. The sloped disengagement means 89 also minimizes contact when rotating microscope optics.

While the illuminator in the preferred embodiment is used with a 1×3 inch standard slide 12 in longitudinal alignment with the light source housings 20 and 21, this is not meant to limit the scope of the claims. For example, the long edge of the slide may be engaged by the housings in a modification of the invention. Additionally, the invention contemplates modifications in which the slide is illuminated and gripped from adjacent perpendicular edges.

Also, the present invention may be modified for use with 2×3 inch slides which are common in many medical procedures. Illumination, while preferred to extend from a minimum of two sides, may be limited to one side. Thus, various combinations and permutations with respect to the lengths and widths of the slide, the number of light sources attached, and the positions of the light source housings are contemplated.

Figure 4:
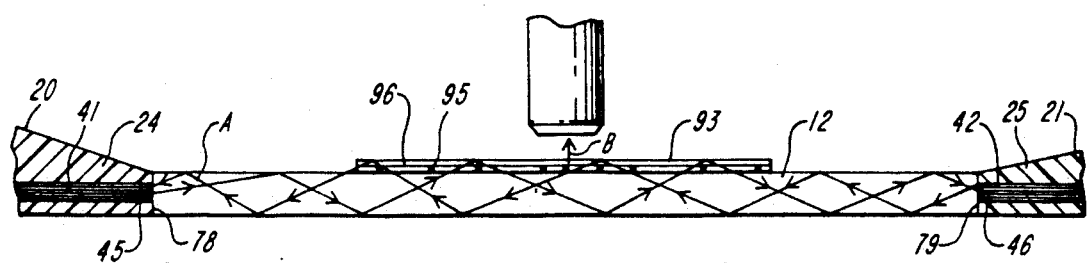
FIG. 4 shows a side elevational view of the present invention taken along the lines 4—4 of FIG. 2.

Features of the present system may be best understood by considering the light path for the darkfield illumination shown in FIG. 4. As the light enters the edge of the slide, there is almost total internal reflection. The light is reflected from the surfaces of the slide as illustrated by arrow A because the light rays emanating from the fiber optic array do not contact the glass to air interfaces at angles which are less than the critical angle. The index of refraction for glass is 1.515 and for air the index of refraction is 1.0. Thus, the angle of incidence must be less than approximately 42 degrees to refract the light rays, otherwise the light is totally reflected in the slide.

Most specimens are permanently mounted in a transparent medium which has an index of refraction similar to glass. In this invention the specimen 95 is mounted beneath coverslip 93 in a transparent medium 96. Similar refractive indices of the slide, medium and cover slip allows light to travel through the medium 96 to the upper surface of the coverslip 93. Some of the light traveling toward the coverslip 93 reflects off the specimen 95 and back toward the coverslip 93. When the angle of the light returning toward the coverslip 93 is less than the critical angle, the light will refract through the coverslip 93 into the air and into the objective lens of the microscope, arrow B. The only light which has the opportunity of reaching the lens is light which bounces off the specimen or is significantly refracted by it. This creates the intense illumination of the specimen while maintaining a darkfield.

Having described this invention in detail, those skilled in the art will appreciate that numerous modifications may be made thereof without departing from the spirit of this invention. Therefore, it is not intended that the scope of this invention be limited to the single embodiment illustrated and described. Rather, it is intended that the scope of this invention be determined by the appended claims and their equivalents.

What is claimed is:

1. An illuminator for a microscope slide comprising a light source and means supporting said light source in longitudinal alignment with an edge of a slide, and means for confining light emanating from said light source to said edge of said slide.

2. An illuminator for a microscope slide as set forth in claim 1 wherein said light source has an output end and means for engaging said output end in facing abutting relation with said edge of said slide.

3. An illuminator for a microscope slide as set forth in claim 2 wherein said means for engaging comprises means for supporting said slide in alignment with said output end and a spring means for releasably securing said slide in said facing abutting relation.

4. An illuminator for a microscope slide as set forth in claim 1 having a housing supporting said light source.

5. An illuminator for a microscope slide as set forth in claim 4 wherein said light source comprises a fiber optic bundle.

6. An illuminator for a microscope slide as set forth in claim 5 wherein said fiber optic bundle has an end arranged in a fan-like array with the free end of said bundle abutting an edge of said slide.

7. An illuminator for a microscope slide comprising a pair of light sources and means supporting said light sources each in coplanar alignment with respective opposing edges of a slide, and means for confining light emitting from said light sources to said respective opposing edges of said slide.

8. An illuminator for a microscope slide as set forth in claim 7 wherein said light sources each comprise a bundle of optical fibers with the bundles having proximate ends in longitudinal alignment and engaging the opposite edges of said slide.

9. An illuminator for a microscope slide comprising a plate having means for receiving a slide, a pair of light sources having high emitting ends positioned in spaced aligned relation with one another, means for securing said light emitting ends in longitudinal alignment with opposite edges of said slide, and means for confining light emanating from said ends to said edges of said slide.

10. An illuminator as set forth in claim 9 wherein said light sources are each secured with said light emitting ends in a pair of housing members, said housing members secured to said plate with spring means normally tensioning one of said housing members toward the other

* * * * *